United States Patent
Meier et al.

(10) Patent No.: US 6,857,787 B1
(45) Date of Patent: Feb. 22, 2005

(54) AXIAL THRUST BEARING

(75) Inventors: Peter Meier, Oberreichenbach (DE); Jürgen Oetjen, Herzogenaurach (DE)

(73) Assignee: Ina-Schaeffler KG, Herzogenaurach (DE)

( * ) Notice: Subject to any disclaimer, the term of this patent is extended or adjusted under 35 U.S.C. 154(b) by 0 days.

(21) Appl. No.: 10/657,502

(22) Filed: Sep. 8, 2003

Related U.S. Application Data

(63) Continuation of application No. PCT/EP02/01202, filed on Feb. 6, 2002.

(51) Int. Cl.$^7$ ............................................. F16C 19/30
(52) U.S. Cl. ....................................................... 384/619
(58) Field of Search ................................ 384/619, 613, 384/615, 622, 620

(56) References Cited

U.S. PATENT DOCUMENTS

| | | |
|---|---|---|
| 3,144,278 A | 8/1964 | Pöhler et al. |
| 3,650,583 A | 3/1972 | Itin et al. |
| 3,830,553 A | 8/1974 | Schürger et al. |
| 4,269,460 A | 5/1981 | Orain |

FOREIGN PATENT DOCUMENTS

| | | |
|---|---|---|
| BE | 374 162 A | 11/1930 |
| DE | 384 819 C | 12/1923 |
| DE | 11 95 558 B | 6/1965 |
| DE | 20 44 074 A | 3/1972 |
| DE | 38 08 556 A1 | 9/1989 |
| DE | 92 14 796 U1 | 2/1993 |
| DE | 44 09 734 C2 | 1/1995 |
| DE | 196 46 351 A1 | 5/1998 |
| FR | 1 339 266 A | 10/1963 |
| IT | 5 92 639 | 5/1959 |

*Primary Examiner*—Lenard A. Footland
(74) *Attorney, Agent, or Firm*—Henry M. Feiereisen

(57) ABSTRACT

An axial bearing includes three running disks disposed in neighboring disposition, thereby defining two outer running disks and a middle running disk between the outer running disks. A first rim of rolling bodies is arranged between one outer running disk and the middle running disk, and a second rim of rolling bodies is arranged between the other outer running disk and the middle running disk. Received in a bore of the first and second rims and supporting the first and second rims of rolling bodies is a sleeve which is securely fixed to a shaft extends in axial direction beyond the outer running disks. The sleeve has one end formed with a radially outwardly directed flange which embraces the adjacent one of the outer running disks, wherein the other outer running disk is securely connected to the sleeve to thereby form a unitary bearing structure.

11 Claims, 4 Drawing Sheets

AXIAL THRUST BEARING

CROSS-REFERENCES TO RELATED APPLICATIONS

This application is a continuation of prior filed copending PCT International application no. PCT/EP02/01202, filed Feb. 6, 2002, on which priority is claimed under 35 U.S.C. §120, the disclosure of which is hereby incorporated by reference.

This application claims the priority of German Patent Applications, Serial Nos. 101 11 514.8, filed Mar. 9, 2001, and 101 30 458.7, filed Jun. 23, 2001, pursuant to 35 U.S.C. 119(a)–(d), the disclosure of which is incorporated herein by reference.

BACKGROUND OF THE INVENTION

The present invention relates, in general, to a thrust bearing, and more particularly to a double-row axial thrust bearing of a type having two rims of rolling bodies disposed in side-by-side relationship between a middle and two outer running disks, with both rims supported with their receiving bore on a sleeve securely fixed to a shaft, and with the middle running disk rotatably arranged on the sleeve.

A thrust bearing of this type is disclosed in German Offenlegungsschrift DE-OS 20 44 074. The sleeve is securely connected to the shaft and has opposite end surfaces for support of two outer running disks, while the middle running disk, disposed between the outer running disks, encircles the sleeve and is rotatably arranged. The integrity of this thrust bearing is realized by a wedge-shaped split ring which snaps in a wedge-shaped groove on the shaft. This type of thrust bearing has many shortcomings. For one, the wedge-shaped ring and the complementary shaft groove have to be made at high precision. Further, this type of thrust bearing cannot be pre-manufactured as a complete structural unit. Rather, the individual components must be shipped to the user in dismantled form.

It would therefore be desirable and advantageous to provide an improved axial thrust bearing to obviate prior art shortcomings and to allow a pre-fabrication thereof in a simple manner while still being reliable in operation.

SUMMARY OF THE INVENTION

According to one aspect of the present invention, an axial thrust bearing, includes three running disks disposed in neighboring disposition, thereby defining two outer running disks and a middle running disk between the outer running disks, a first rim of rolling bodies arranged between one of the outer running disks and the middle running disk, and a second rim of rolling bodies arranged between the other one of the outer running disks and the middle running disk, and a sleeve received in a bore of the first and second rims and supporting the first and second rims of rolling bodies, wherein the sleeve is securely fixed to a shaft and extends in axial direction beyond the outer running disks, wherein the sleeve has one end formed with a radially outwardly directed flange which embraces the adjacent one of the outer running disks, wherein the other one of the outer running disks is securely connected to the sleeve to thereby form a unitary bearing structure under tension.

The present invention resolves prior art problems by providing a plug-in type bearing assembly which is easy to implement and results in a pre-fabricated axial thrust bearing which is under a desired tension. The thus pre-fabricated compact unitary bearing structure can be transported to the user, without risk of disintegration, and enables the user to install the unitary bearing structure in a simple manner.

According to another feature of the present invention, the other one of the outer running disks may have an L-shaped configuration, thereby defining a first leg and a second leg, with the first leg being shorter than the second leg and placed over the sleeve, wherein the first leg can be connected to the sleeve by swaging, gluing or welding.

According to another feature of the present invention, there may be provided a resilient clamping ring for acting upon the other one of the outer running disks in an axial direction, wherein the clamping ring is supported on the sleeve. In this way, the thrust bearing can be assembled in a particularly simple manner. Suitably, the clamping ring is made of a material which is harder than a material of the sleeve. As a result, the resilient clamping ring can dig into the sleeve, just like a knife, to thereby provide for a secure axial union of the unitary structure.

According to another feature of the present invention, the middle running disk may have a diameter which is greater than a diameter of the outer running disks. Suitably, the middle running disk is provided with at least one through-bore. This has the advantage that the entire unitary bearing structure is easy to install for attachment to a desired construction.

According to another feature of the present invention, the sleeve and the running disks can be made through a shaping process without material removal. In this way, differently configured axial thrust bearings of various sizes can be made and suited to the respective application in a simple and cost-efficient manner.

According to another feature of the present invention, the rims of rolling bodies may be configured as roller rims or ball rims.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
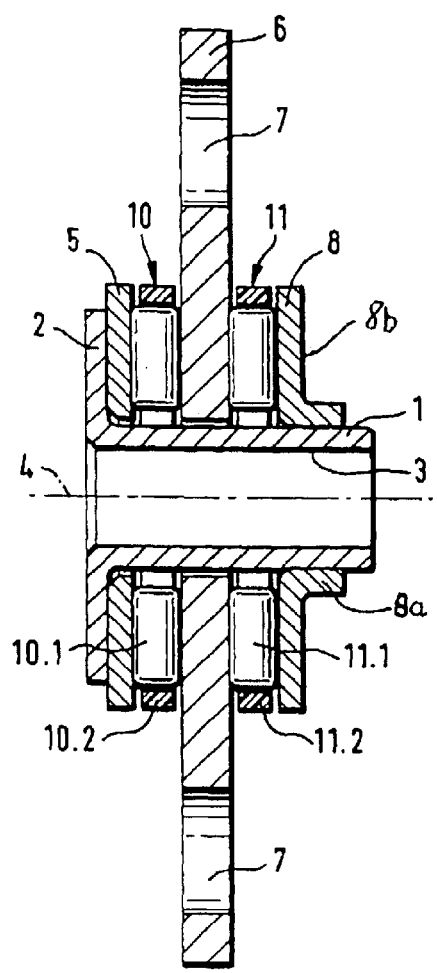
FIG. 1 is a longitudinal section of a first embodiment of an axial thrust bearing according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
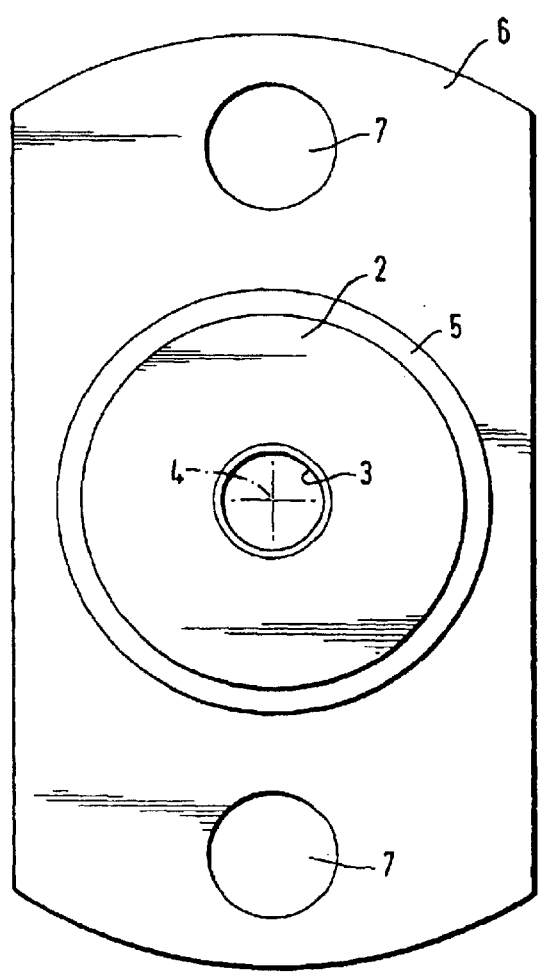
FIG. 2 is a side view of the axial thrust bearing of FIG. 1.

Turning now to the drawing, and in particular to FIG. 1, there is shown a longitudinal section of a first embodiment of an axial thrust bearing according to the present invention. The axial thrust bearing is of double-row type and includes a sleeve 1 which has one end (left-hand side in FIG. 1)

configured to form a flange 2 which is directed radially outwards. The sleeve 1 is formed with a receiving bore 3 for attachment onto a shaft (not shown) in fixed rotative engagement for rotation about the longitudinal center axis 4. Placed adjacent the flange 2 and thus embraced by the sleeve 1 and the flange 2 is a first outer running disk 5 to provide a raceway for a roller rim, generally designated by reference numeral 10 and including a plurality of bearing needles 10.1 and a cage 10.2 for retaining the bearing needles 10.1. The roller rim 10 is sandwiched between the running disk 5 and a middle running disk 6 which, as also shown by the side view of the thrust bearing in FIG. 2, is provided with fastening bores 7 for attachment of the thrust bearing to a further structure (not shown). Placed between the middle running disk 6 and a second outer running disk 8 is a second roller rim, generally designated by reference numeral 11 and including a plurality of bearing needles 11.1 and a cage 11.2 for retaining the bearing needles 11.1. The two outer running disks 5, 8 and the middle running disk 6 are thus arranged on the sleeve 1 in neighboring relationship at axial spaced-apart disposition, with respectively interposed roller rims 10, 11. The second running disk 8 completes the unitary construction of the axial thrust bearing and has a substantially L-shaped configuration, thereby defining a short leg 8a and a long leg 8b, with the short leg 8a placed over the sleeve 1. After adjusting a desired axial tension, the second running disk 8 is securely connected to the sleeve 1, e.g. through gluing, swaging or welding.

As shown in FIG. 1, the middle running disk 6 has a diameter which is greater than a diameter of the outer running disks 5, 6. Suitably, the sleeve 1 and the running disks 5, 6, 8 are made through a shaping process without material removal.

The axial thrust bearing according to the present invention is assembled as follows. The first outer running disk 5 is first pushed over the sleeve 1 and placed against the flange 2. Subsequently, the roller rim 10, followed by the middle running disk 6, the roller rim 11 and the second outer running disk 8 are then placed sequentially over the sleeve 1. The thus assembled complete axial thrust bearing is then set under a desired tension in a suitable assembly device through application of an axial compressive force before securely fixing the second outer running disk 8 to the sleeve 1.

Figure 3:
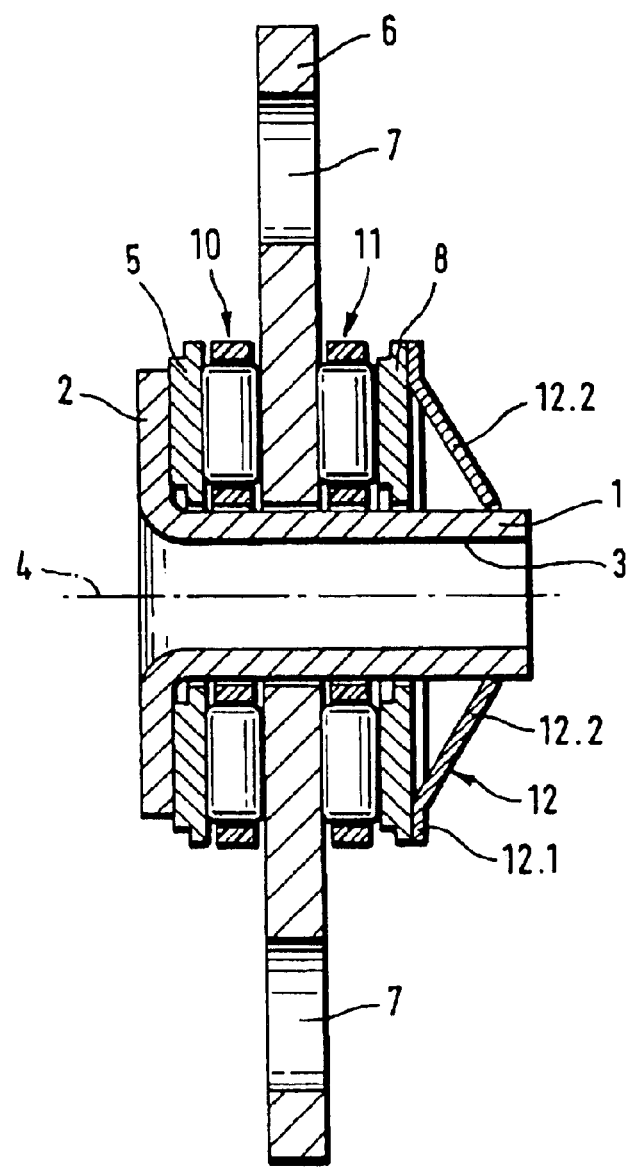
FIG. 3 is a longitudinal section of a second embodiment of an axial thrust bearing according to the present invention.

Referring now to FIG. 3, there is shown a longitudinal section of a second embodiment of an axial thrust bearing according to the present invention. Parts corresponding with those in FIG. 1 are denoted by identical reference numerals and not explained again. The description below will center on the differences between the embodiments. In the embodiment of FIG. 3, provision is made for a resilient clamping ring, generally designated by reference numeral 12 which is secured to the sleeve 1 and abuts against the outer running disk 8 which has now a flat configuration, instead of an L-shaped configuration.

Figure 4:
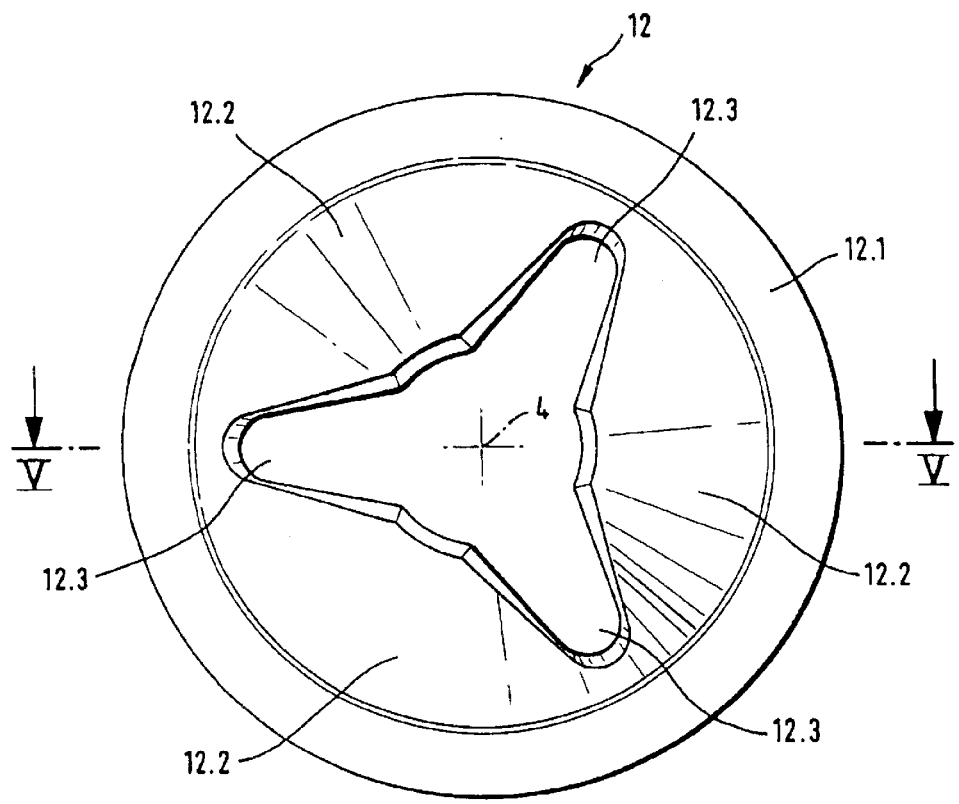
FIG. 4 is a top view of the axial thrust bearing of FIG. 3.
Figure 5:
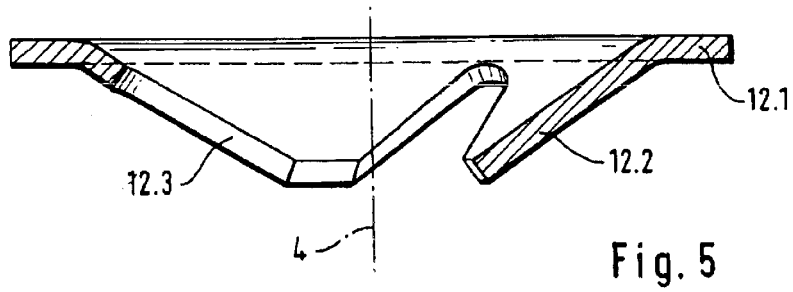
FIG. 5 is a longitudinal section through a clamping ring of the axial thrust bearing of FIG. 3, taken along the line V—V in FIG. 4.

As shown in particular in FIGS. 4 and 5, the clamping ring 12 has a circular ring shaped base 12.1, which embraces the running disk 8 on the outside, and resilient tabs 12.2, which extend from the base 12.1 radially inwards in spaced-apart relationship. The tabs 12.2 are separated from one another by openings 12.3 and extend at an inclination at an angle toward the longitudinal center axis 4. This ensures that the radially inwardly positioned ends of the tabs 12.2 are able to dig into the outer surface area of the sleeve 1 to thereby adjust the desired tension of the axial thrust bearing.

Figure 6:
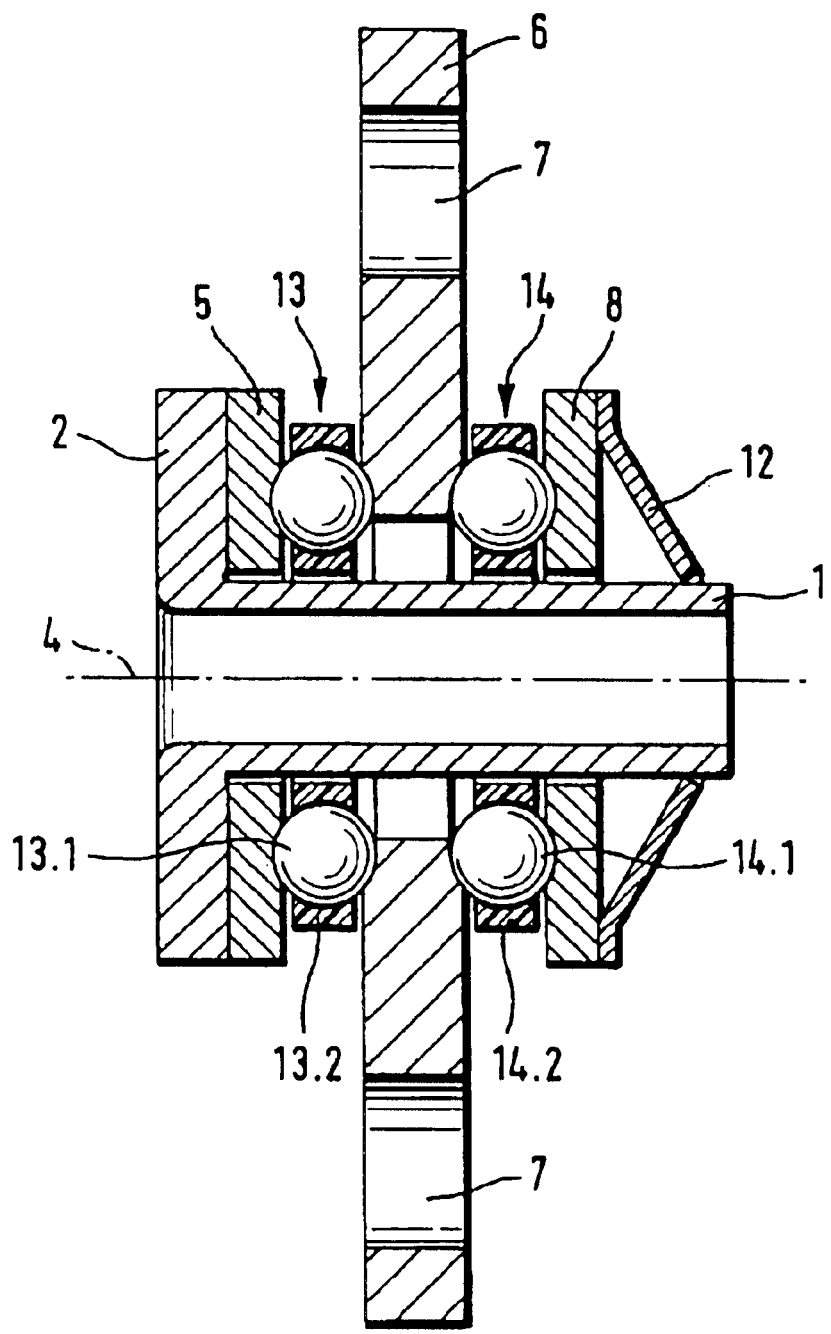
FIG. 6 is a longitudinal section of a third embodiment of an axial thrust bearing according to the present invention.

FIG. 6 shows a longitudinal section of a third embodiment of an axial thrust bearing according to the present invention. Parts corresponding with those in FIG. 3 are denoted by identical reference numerals and not explained again. This embodiment differs from the embodiment of FIG. 3 only by the provision of rolling body rims in the form of ball rims 13, 14. Compared to the roller rims 10, 11, as shown in FIG. 3, the provision of ball rims 13, 13 has the advantage of a reduced friction While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. An axial thrust bearing, comprising:
   three running disks disposed in neighboring disposition, thereby defining two outer running disks and a middle running disk between the outer running disks;
   a first rim of rolling bodies arranged between one of the outer running disks and the middle running disk, and a second rim of rolling bodies arranged between the other one of the outer running disks and the middle running disk; and
   a sleeve received in a bore of the first and second rims and supporting the first and second rims of rolling bodies, said sleeve securely fixed to a shaft and extending in axial direction beyond the outer running disks, said sleeve having one end formed with a radially outwardly directed flange which embraces the adjacent one of the outer running disks, wherein the other one of the outer running disks is securely connected to the sleeve to thereby form a unitary bearing structure.

2. The thrust bearing of claim 1, wherein the other one of the outer running disks has an L-shaped configuration, thereby defining a first leg and a second leg, with the first leg being shorter than the second leg and placed over the sleeve, wherein the first leg is connected to the sleeve by swaging.

3. The thrust bearing of claim 1, wherein the other one of the outer running disks has an L-shaped configuration, thereby defining a first leg and a second leg, with the first leg being shorter than the second leg and placed over the sleeve, wherein the first leg is connected to the sleeve by gluing.

4. The thrust bearing of claim 1, wherein the other one of the outer running disks has an L-shaped configuration, thereby defining a first leg and a second leg, with the first leg being shorter than the second leg and placed over the sleeve, wherein the first leg is connected to the sleeve by welding.

5. The thrust bearing of claim 1, and further comprising a resilient clamping ring acting upon the other one of the outer running disks in an axial direction, said clamping ring being supported on the sleeve.

6. The thrust bearing of claim 5, wherein the clamping ring is made of a material which is harder than a material of the sleeve.

7. The thrust bearing of claim 1, wherein the middle running disk has a diameter which is greater than a diameter of the outer running disks.

8. The thrust bearing of claim 1, wherein the middle running disk is provided with at least one throughbore.

9. The thrust bearing of claim 1, wherein the sleeve and the running disks are made through a shaping process without material removal.

10. The thrust bearing of claim 1, wherein the first and second rims of rolling bodies are configured as roller rims.

11. The thrust bearing of claim 1, wherein the first and second rims of rolling bodies are configured as ball rims.

* * * * *

UNITED STATES PATENT AND TRADEMARK OFFICE
CERTIFICATE OF CORRECTION

PATENT NO. : 6,857,787 B1
DATED : February 22, 2005
INVENTOR(S) : Peter Meier and Jürgen Oetjen It is certified that error appears in the above-identified patent and that said Letters Patent is hereby corrected as shown below:

<u>Title page,</u>
Insert Item:
-- [30]      Foreign Application Priority Data
  March 9, 2001   (DE) .............................. 101 11 514.8
  June 23, 2001   (DE) .............................. 101 30 458.7 --.

Signed and Sealed this

Thirteenth Day of September, 2005

JON W. DUDAS
*Director of the United States Patent and Trademark Office*